DE WITT C. HOWARD.
UTENSIL HANDLE.
APPLICATION FILED SEPT. 24, 1907.
921,404.
Patented May 11, 1909.
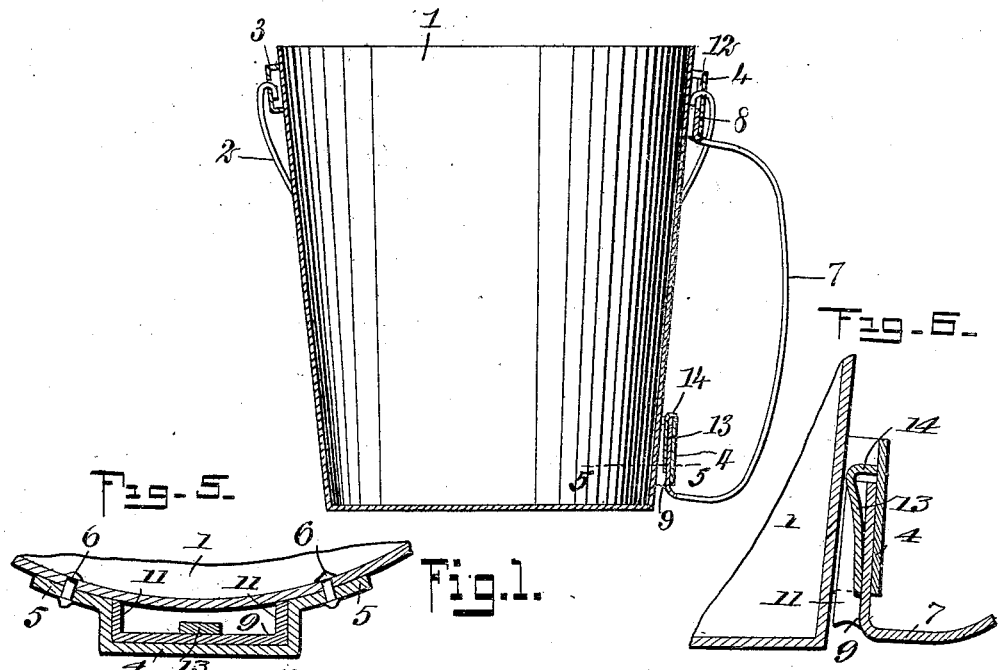
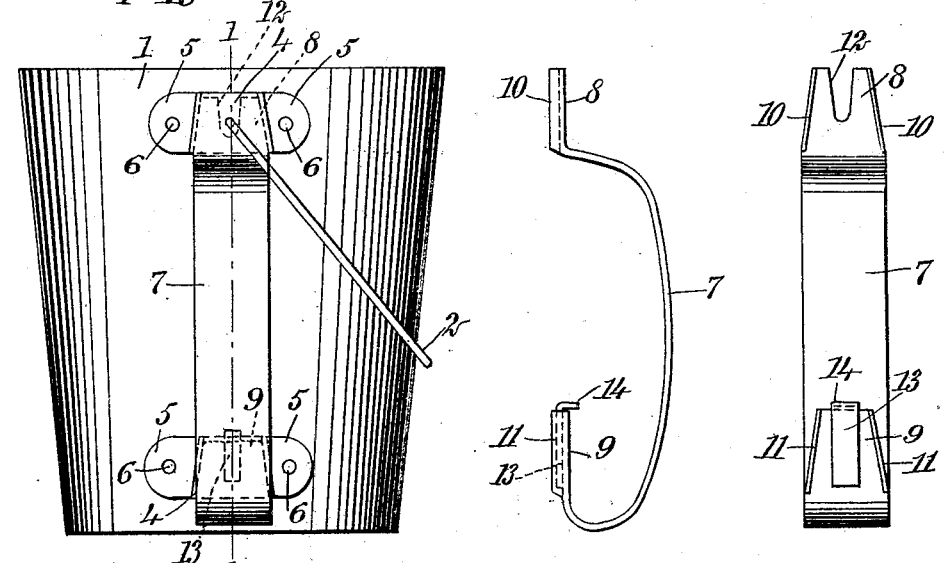

UNITED STATES PATENT OFFICE.

DE WITT C. HOWARD, OF HELENA, MONTANA.

UTENSIL-HANDLE.

No. 921,404.  Specification of Letters Patent.  Patented May 11, 1909.

Application filed September 24, 1907. Serial No. 394,322.

*To all whom it may concern:*

Be it known that I, DE WITT C. HOWARD, a citizen of the United States, and a resident of Helena, in the county of Lewis and Clark and State of Montana, have invented a new and Improved Utensil-Handle, of which the following is a full, clear, and exact description.

This invention relates to utensil handles and is particularly useful in connection with pails, cans, and similar receptacles.

An object of the invention is to provide a simple, strong and durable handle for vessels, which can be easily attached to the same in order to convert them into scoops or dippers.

A further object of the invention is to provide a device of the class described comprising a removable handle which can be applied to the vessel without interfering with the cover or bail of the latter, and which can be rapidly and easily attached or detached.

The invention consists in the construction and combination of parts to be more particularly described hereinafter and fully set forth in the claims.

Reference is to be had to the accompanying drawings forming a part of this specification, in which similar characters of reference indicate corresponding parts in all the views, and in which—

Figure 1 is a longitudinal section taken on the line 1—1 of Fig. 2, of a pail with my invention applied thereto. Fig. 2 is an elevation of the same; Fig. 3 is a side elevation of the removable handle; Fig. 4 is an elevation showing the inner side of the handle. Fig. 5 is a detail transverse sectional view on an enlarged scale, the section being on the line 5—5 of Fig. 1; and, Fig. 6 is a detail longitudinal sectional view on an enlarged scale showing the position the spring catch bar assumes when its finger has been disengaged from the socket and the toe is being withdrawn from said socket.

Before proceeding to a more detailed explanation of my invention it should be understood that the same is particularly applicable to pails or buckets and the like, notwithstanding that it can be usefully employed in connection with other vessels. By means of the removable handle which I provide, a small bucket or pail such as a lard pail can be easily converted into a vessel, scoop or dipper for various purposes. The receptacle handle in no way interferes with the bail or the cover of the bucket when these are used in connection therewith, and it can, further, be attached or detached without difficulty and in a very short space of time.

The device can be manufactured cheaply and made from inexpensive material, preferably sheet metal such as tinned iron.

Referring more particularly to the drawings, the bucket or pail 1, which is illustrated as an example of the utensils to which my invention is applicable, may be of any suitable form such for instance, as the vessel in which lard is usually packed. In this case the pail is of tin or other sheet metal and is provided with a bail 2 and a cover (not shown). The bail 2 is usually of wire and has the ends located in buttons or sockets 3 soldered or otherwise suitably secured to the vessel.

I employ U-shaped offset plates 4 having laterally disposed toes 5 and constituting sockets. The sockets are secured to the pail by means of rivets 6 which fasten the toes 5 to the wall of the vessel. It will be understood that if desired, the sockets may be fastened in position in any other suitable manner, for instance, by soldering. I prefer to employ two sockets to each vessel, located respectively near the top and bottom of the same. The upper socket, which is provided with an opening for the purpose, serves as a bearing for one end of the bail as is shown most clearly in Fig. 1. The handle 7 can be formed from sheet metal suitably bent into form to be conveniently grasped by the hand, and has similarly disposed toes 8 and 9 at the ends, which are tapered as is shown most clearly in Fig. 4. The lateral edges of the toes 8 and 9 are strengthened by having the material formed into lateral flanges 10 and 11. The toe 8 is provided with a recess 12 extending inwardly from the upper edge for a purpose which will appear hereinafter. The lower toe 9 carries between the flanges 11, a spring catch bar 13 preferably soldered in position at one end and provided at the free end with a laterally disposed finger 14. The upper free end of the catch bar is free to move toward and from the toe of the handle, being held normally in contact with said toe.

The arrangement is such that the toes 8 and 9 can be easily inserted in the upper and lower sockets 4 respectively, whereby the handle is mounted in position upon the vessel. When the toes are inserted in the sockets, the recess 12 in the upper toe receives the end of the bail pivoted to said socket, and the finger 14 of the spring catch bar 13 snaps over the upper edge of the lower socket as shown in Fig. 1, and securely locks the handle to the pail. When it is desired to remove the handle, it is only necessary to force the spring catch bar back to disengage its finger from the upper edge of the socket as shown in Fig. 6, when the toes can be withdrawn from the sockets.

It will be understood that the handle may be of any convenient form and size, and that the device can be applied not only to pails but to vessels of various types. It in no way interferes with the use of the bail or the cover when such are employed, and can be applied or removed easily and expeditiously.

Having thus described my invention, I claim as new and desire to secure by Letters Patent:

1. The combination with a vessel provided with sockets near its upper end, a bail pivoted to the sockets, and a socket below and in alinement with one of the first named sockets, of a handle having at its ends flanged toes projecting in the same direction, and adapted to enter the lower socket and one of the upper sockets, the upper toe having an inwardly extending recess adapted to receive the end of the bail and the lower one provided with a spring catch between the flanges thereof and having an outwardly projecting finger for engaging the upper edge of the lower socket to lock the handle in position.

2. The combination with a bailed vessel provided with sockets arranged one above the other, the upper socket serving as a bearing for one end of the bail, of a handle having toes projecting in the same direction and adapted to enter the said sockets, the upper toe having an inwardly extending recess adapted to receive the end of the bail and the lower one provided with a spring catch having an outwardly projecting finger for engaging the upper edge of the lower socket to hold the handle in position.

3. The combination, with a utensil having sockets and a bail, one of said sockets serving as a bearing for said bail, of a removable handle having toes projecting in the same direction and adapted to be inserted in said sockets, one of said toes having a spring catch for engaging one of the sockets to hold the handle in position.

4. The combination, with a utensil having offset U-shaped plates constituting sockets, and a bail, one of said sockets serving as a bearing for said bail, of a removable handle having similarly disposed toes adapted to be inserted in said sockets, one of the toes having a spring catch provided with an outwardly projecting finger adapted to engage an edge of one of said sockets to lock said handle in position.

5. The combination, with a utensil having offset U-shaped sockets, and a bail, one of said sockets serving as a bearing for said bail, of a removable handle having similarly disposed tapered toes at the ends, said toes being adapted to be inserted in said sockets, one of said toes having a recess adapted to receive the end of the bail journaled in the socket, the other of said toes having a spring catch bar adapted to engage an edge of the socket in which it fits to lock said handle in position.

In testimony whereof I have signed my name to this specification in the presence of two subscribing witnesses.

DE WITT C. HOWARD.

Witnesses:
  C. J. BRACKETT,
  LOUIS F. SCHOEAN.